Jan. 25, 1955 A. R. PEZZILLO, JR 2,700,343
MOTOR PUMP UNIT
Filed May 11, 1950 3 Sheets-Sheet 1

INVENTOR
Albert R. Pezzillo, Jr.
BY
Herbert P. Fairbanks
ATTORNEY

Jan. 25, 1955
A. R. PEZZILLO, JR
2,700,343
MOTOR PUMP UNIT
Filed May 11, 1950
3 Sheets-Sheet 2
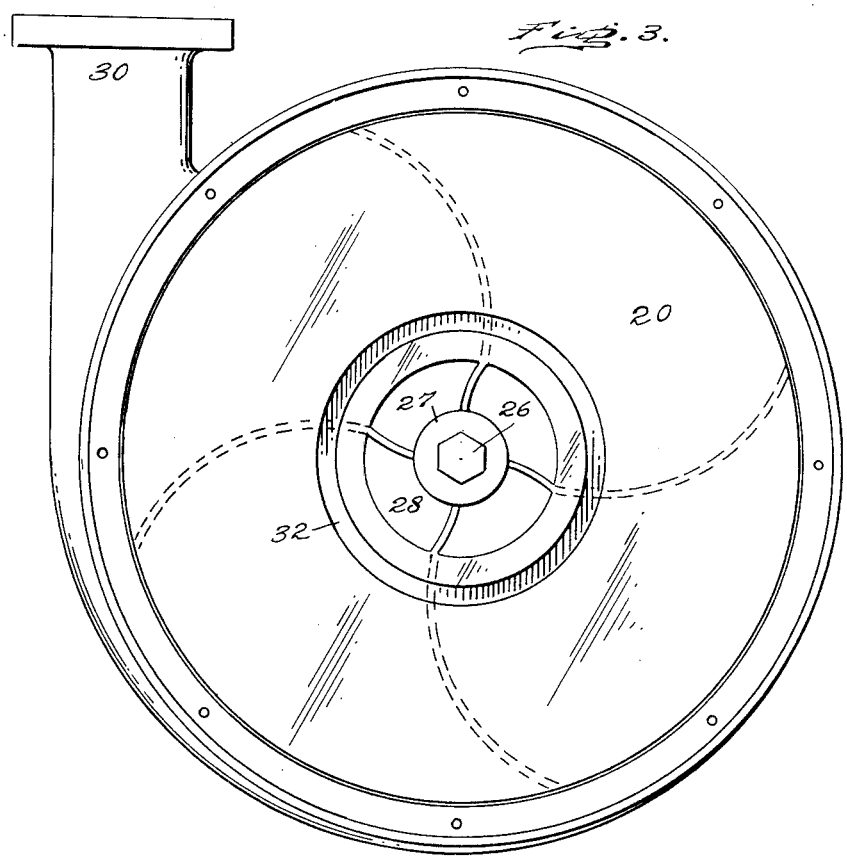
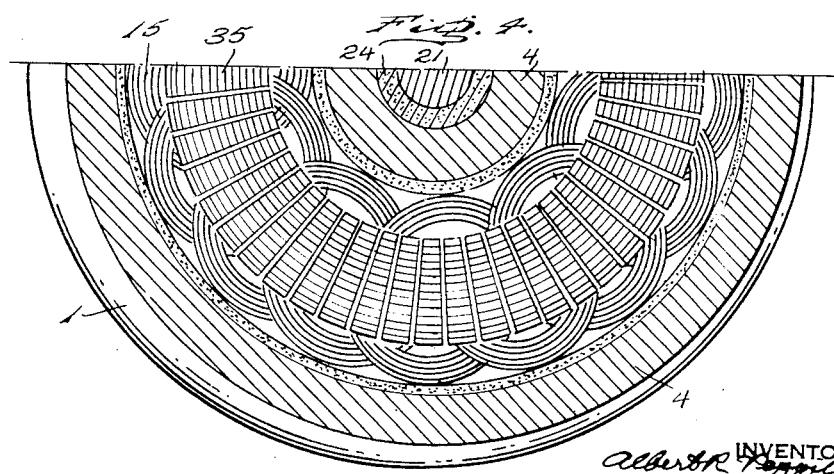
INVENTOR
Albert R. Pezzillo, Jr.
BY
Herbert A. Fairbanks
ATTORNEY

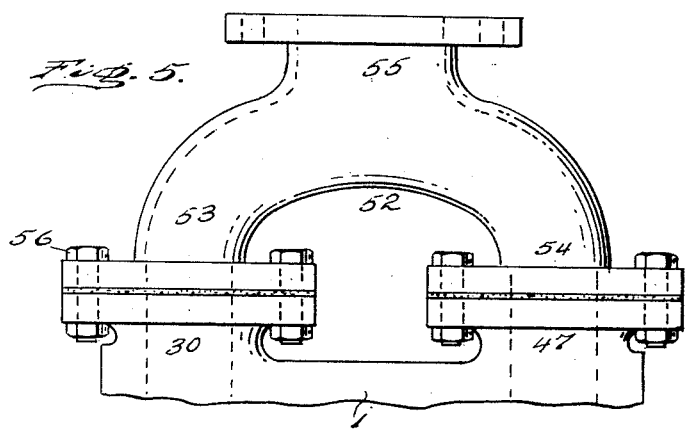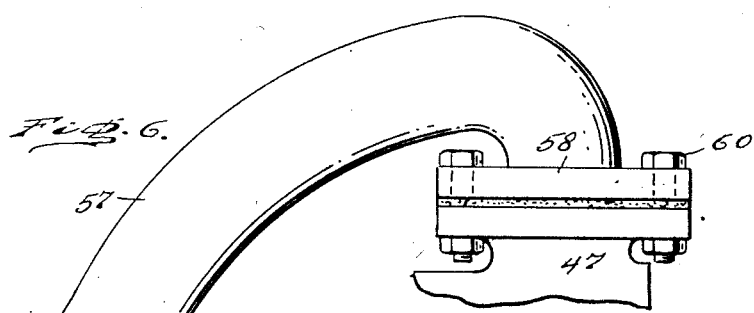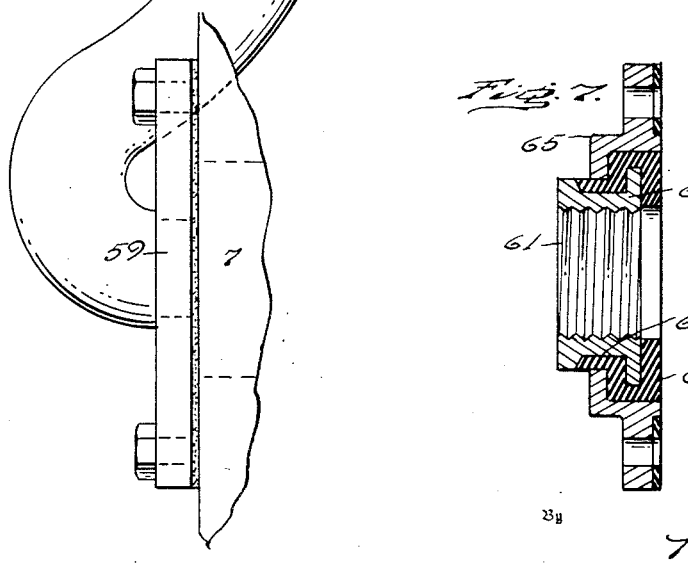

United States Patent Office 2,700,343
Patented Jan. 25, 1955

2,700,343

MOTOR PUMP UNIT

Albert R. Pezzillo, Jr., Philadelphia, Pa.

Application May 11, 1950, Serial No. 161,346

7 Claims. (Cl. 103—87)

The object of my present invention is to devise a novel motor pump unit employing a plurality of motors of the axial gap type, the construction and arrangement being such that the mechanical and axial magnet pull of the motors is balanced. In other words, the mechanical and electrical axial magnet pull of one impeller-rotor unit in one direction is compensated for and balanced by the mechanical and electrical axial magnet pull in the opposite direction of the other impeller-rotor unit.

A further object of the invention is to devise a novel motor pump unit of the character aforesaid, wherein each motor drives its own impeller with an independent discharge from each impeller or a common discharge from the impellers.

A further object of the invention is to devise a novel motor pump unit having a plurality of motor driven pumps within a common housing and having means to connect the discharge from one pump to the intake of the other pump, thereby converting the motor pump unit from single stage to a multiple stage pump.

A further object of the invention is to form the impellers and rotors in such a manner that they can be mounted as a unit on a common shaft journalled in the housing of the motor pump unit.

The motors may be of the single phase or polyphase type and are designed for use with alternating current.

With the foregoing and other objects in view as will hereinafter clearly appear in the detailed description and the appended claims, my invention comprehends a novel motor pump unit having motors of the axial gap type, and arranged to balance the mechanical and electrical axial magnet pull exerted on the impeller-rotor units.

A further object of the invention is to devise a novel motor pump unit employing motors of the axial gap type wherein impeller-rotor units are mounted in separate chambers of a common housing on a common shaft and fixed to such shaft so that the impeller-rotor units revolve in unison.

A further object of the invention is to devise a novel motor pump unit having end chambers separated by a solid wall with end closures for the chambers so that an impeller-rotor unit can be fixed to the shaft, the shaft inserted through a bearing sleeve in said solid wall and the other impeller-rotor unit fixed to the same shaft.

A further object of the invention is to devise novel means for securing an impeller to the shaft so that the impeller may have a fixed position on the shaft and be assembled by sliding it on to the shaft.

A further object of the invention is to devise a novel construction wherein a flange on the sleeve bearing bears against the central portion of the non-magnetic cylinder to retain the central portion of the disc in position, the construction being such that the impeller bears against the flange of the sleeve bearing.

A further object of the invention is to devise a novel construction and arrangement of a motor pump unit which without any changes in the working parts can be provided with an independent discharge from each pump or a common discharge, and one where the discharge from one pump can be connected to the intake of another pump of the combination.

A further object is to provide for a volute discharge from the impellers.

For the purpose of illustrating the invention, I have shown in the accompanying drawings preferred embodiments of it which, in practice, will give satisfactory and reliable results. It is, however, to be understood that the various instrumentalities of which the invention consists can be variously arranged and organized and the invention is not limited to the exact arrangement and organization of these instrumentalities as herein set forth.

Figure 3 is an end elevation of an impeller and its housing with an end housing member removed.

Figure 4 is a section on line 4—4 of Figure 1.

Figure 5 is an elevation of a manifold for converting the motor pump unit to provide a single discharge from the pumps.

Figure 6 is a fitting attachable to the discharge from one pump and the intake of another pump to increase the number of stages of the motor pump unit.

Figure 7 is a sectional view of a flexible coupling which may be employed to connect the motor pump unit in a pipe line.

Similar numerals of reference indicate corresponding parts.

Figure 1:
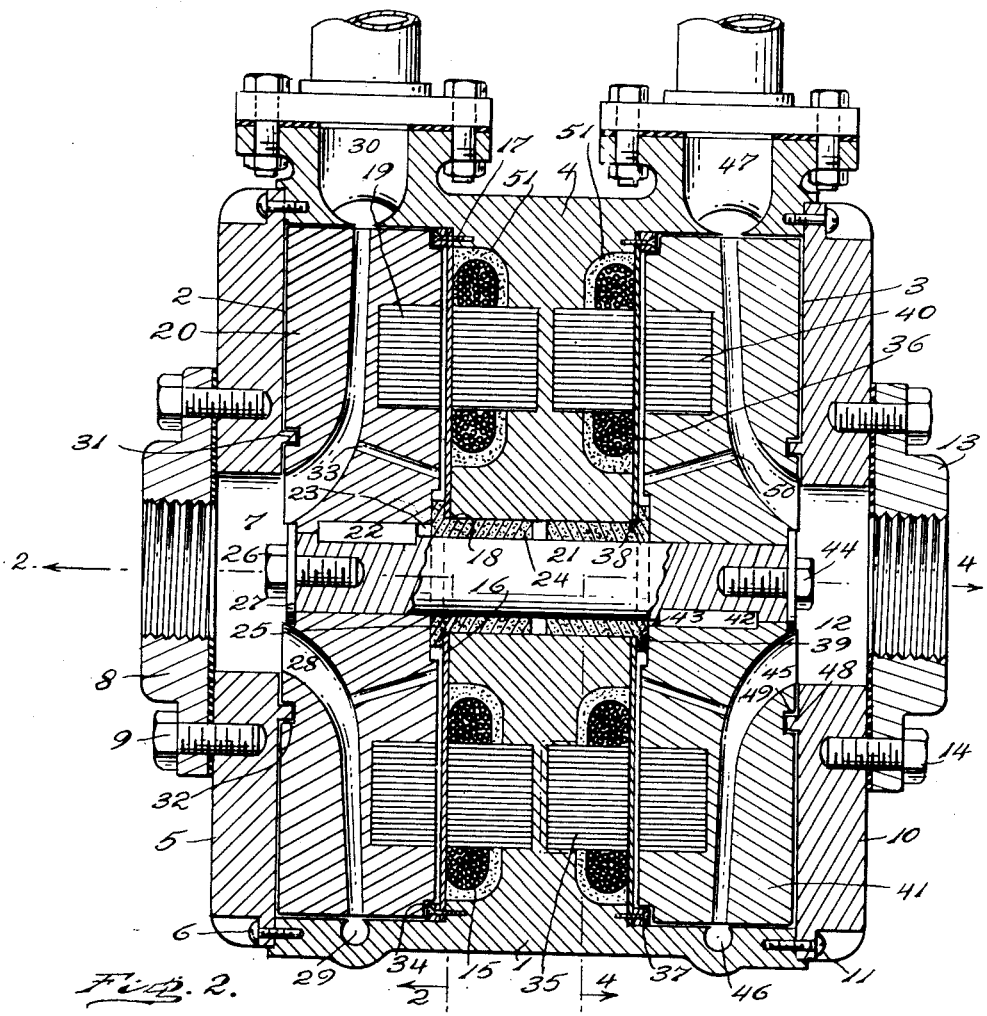
Figure 1 is a sectional elevation of a motor pump unit, embodying my invention.
Figure 2:
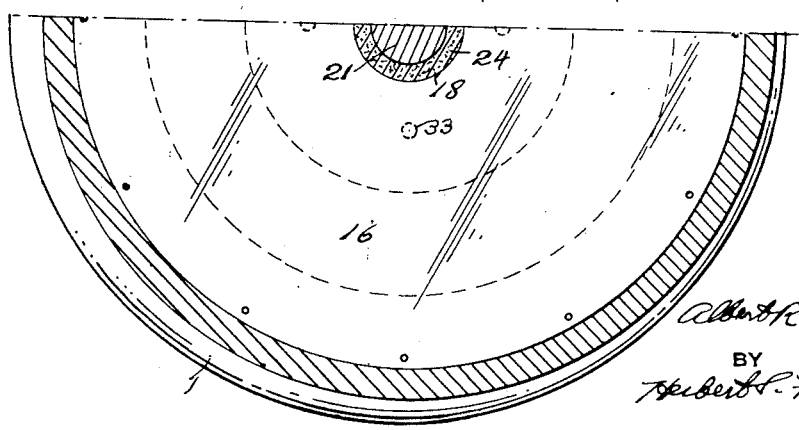
Figure 2 is a section on line 2—2 of Figure 1.

Referring to the drawings:

In Figure 1, I have shown a motor pump unit having a housing 1 recessed at opposite sides to form chambers 2 and 3, respectively, the chambers being separated by a solid wall or web 4. The chamber 2 is closed by an end housing member 5 fixed to the housing by fastening devices 6 and provided with a fluid intake 7, which leads from a suitable source of fluid supply. A flanged coupling 8, shown as threaded to receive a pipe connection, is secured to the end member 5 by fastening device 9.

In a similar manner, the chamber 3 is closed by an end housing member 10 secured to the housing by fastening devices 11. The member 10 has a fluid intake 12, and a flanged coupling 13 adapted by threading to receive a pipe leading from a source of fluid supply is secured to the housing by fastening devices 14. The intakes 7 and 12 may be independent or may be connected to form a common intake from a source of fluid supply.

The wall 4 dividing the housing into the chambers 2 and 3 has a stator 15 of one motor set into its face adjoining the chamber 2, and is isolated from such chamber by a disc 16 of non-magnetic material having high electrical resistance. The disc is fixed to the housing near the outer periphery of the disc by fastening devices 17 comprising a ring and screws. The disc has a central opening 18 which is sealed in a manner hereinafter described.

The stator cooperates with a rotor 19 in axial alignment with it, the rotor being mounted in a side wall of an impeller 20 to form therewith an impeller-rotor unit. The impeller is fixed to a shaft 21 in any desired manner and for example as shown by a key 22 set into the shaft and extending into a slot 23 in the impeller, said slot opening through the inner face of the impeller. The shaft is rotatably mounted in a sectional sleeve bearing 24 extending through the wall 4. One section of the sleeve bearing has a flange 25 which bears against the central portion of the disc 16 surrounding its opening to retain the central portion of the disc in sealed and fixed condition with the housing and seal and isolate the stator windings from the fluid being impelled.

A bolt 26 is threaded into one end of the shaft 21 and passes through a washer 27 bearing against the impeller. Impeller passages 28 lead from the intake 7 through the periphery of the impeller to a centrifugal passage 29 in the housing which discharges at 30.

The end member 5 of the housing has an annular rib 31 extending into an annular groove in the impeller as shown at 32. The impeller, if desired, may have passages leading through it to contribute to hydraulically balance the impeller-rotor unit, as shown at 33.

The impeller has an annular recess near its outer periphery providing clearance for the fastening devices of the disc 16, as shown at 34.

The other motor pump is of the same construction as that already described and is located at the opposite side of the wall 4 in the chamber 3.

A stator 35 of the second motor is set into the side wall of the wall 4 adjacent the chamber 3, and the windings of the stator are isolated from the fluid being impelled by a non-magnetic disc 36 having high electrical resistance characteristics and having its outer periphery fixed to the housing by fastening devices 37 and provided with a central opening 38. A flange 39 on a section of the sleeve bearing 24 bears against the central portion surrounding the opening and seals such opening from the fluid being impelled.

A rotor 40 in axial alignment with the stator 35 is mounted in a side wall of an impeller 41 to form therewith an impeller-rotor unit. The impeller is fixed on the shaft 21 by a key 42 set into the shaft and extending into a slot 43 in the impeller, said slot opening through the inner face of the impeller. A nut and washer 44 retains the impeller-rotor unit in position.

Impeller passages 45 lead from the intake 12 through the periphery of the impeller to a centrifugal passage in the housing as shown at 46 and the passage 46 communicates with a discharge 47.

An annular rib 48 on the end housing member 10 extends into an annular groove 49 in the impeller. Passages 50 may be provided through the impeller to contribute to hydraulic balance of the impeller-rotor unit of the second motor driven pump.

The void in the chambers in which the stators are mounted may be filled with insulating material 51.

It will now be clear that the two impeller-rotor units are fixed to the same shaft and driven simultaneously. The two pumps may have independent intakes or a common intake. The two pumps may have independent discharges or a common discharge. The discharge of one pump can be connected to the intake of the other pump.

If a common discharge from the discharge outlets 30 and 47 is desired, a manifold 52 may be employed having branches 53 and 54 and a common outlet 55, the branch 53 for example being secured to the housing by bolts 56 to register with the pump discharge 30, and the branch 54 being secured to the housing in a similar manner to register with the discharge 47.

If a two stage pump is desired, a fitting 57 having a flanged intake end 58 is secured to the housing to register with the discharge 47 of one pump, and a flanged portion 59 is secured to the housing end member 55 to register with the intake of the other pump. Conventional bolts 60 secure the fitting 57 in place.

If a flexible connection of the motor pump unit to a pipe line is desired the flexible coupling shown in Figure 7 may be used. A threaded connector 61 has an annular flange at its inner end as at 62 and in rear of the flange an annular recess 63 with gasket material 64 molded to the connector to be retained in the recess 63, surround the flange and extend over the inner face of the connector. A flanged clamping member 65 overhangs the gasket material surrounding the flange and is compressed towards the housing by clamping bolts 66. The use of the flexible coupling enables one to prevent vibrations created in the motor pump unit from being transferred into the pipe line to which the motor pump unit is connected.

The operation will now be apparent to those skilled in this art. Since the impeller-rotor units are fixed to a common shaft mounted for free longitudinal adjustment in the sleeve bearing and the axial magnetic pull of the motors is in opposite directions, the pull of one unit will be balanced by the pull of the opposite unit.

The hydraulic balance formed by the passages connecting the high and low pressure sides of the impellers may be omitted if desired.

The fluid is impelled from the intakes of the impellers to the housing discharges through the impeller passages such as 28 and 45, and as hereinbefore explained the pumps may have independent discharges or a common discharge. The discharge of one pump may be connected to the intake of another pump.

In order to illustrate the invention, I have shown two combined motor pumps in a common housing, and any desired multiple of two may be employed arranged so that the axial magnetic pull of the motors in opposite directions will be balanced.

Having thus described my invention, what I claim as new and desire to secure by Letters Patent is:

1. In a motor pump unit, a housing having separate pumping chambers located at opposite ends of the housing with a housing web therebetween, each chamber being provided with a separate fluid intake and a separate outlet, impellers in said chambers, a shaft journalled in the housing and on which the impellers are fixed, and axial gap motors, having their stators carried by the housing and having their rotors carried by the impellers.

2. In a motor pump unit, a housing having a central web contributing to form separate chambers at opposite sides of the web, each chamber being provided with a separate volute outlet, end closures fixed to the housing and closing one end of the chambers and having separate fluid intakes, a bearing journalled in the web and extending into the chambers, a shaft rotatable in said bearing, an impeller in each chamber and fixed to said shaft, a motor rotor axially mounted on each impeller to form therewith an impeller-rotor unit for each chamber, and motor stators axially mounted on the web in alignment with the rotors.

3. In a motor pump unit, a housing having a central web contributing to form separate pumping chambers at opposite sides of the web, each chamber being provided with a volute outlet, end closures fixed to the housing and closing one end of the chambers and having separate fluid intakes, a sectional bearing in the web having end flanges, a shaft journalled in the bearing, impellers in the chambers fixed to said shaft, axial gap type motors having their stators carried by the web and their rotors carried by the impellers, a sealing member for each stator having its outer portion fixed to the housing and having an opening at its central portion to receive said bearing, and said bearing having its end flanges overlying and contacting the sealing members to seal the central portions of the sealing members.

4. The construction defined in claim 3, wherein the web is recessed to receive the stators and the impellers are recessed to receive the rotors.

5. In a motor pump unit, a housing having a web contributing to form pumping chambers at opposite sides of the web, the chambers having volute outlets, end closures fixed to the housing and closing one end of the chambers and having fluid intakes, a shaft bearing extending through the web, a shaft journalled in said bearing, impellers in the chambers having at their central portions slots opening through their inner sides, keys on the shaft received in said slots, and axial gap type motors, the stators of which are mounted on the web and the rotors of which are mounted on the impellers.

6. In a motor pump unit, a housing having a web contributing to form pumping chambers at opposite sides of the web, the chambers having volute outlets, end closures fixed to the housing and closing one end of the chambers and having fluid intakes, a shaft journalled in the web, impellers in the chambers and fixed on the shaft, axial gap type motors having their stators on the web and their rotors fixed on the impellers, discs covering the side of the stator and sealing the stators from the fluid being impelled, fastening devices securing the peripheral portion of the discs to the web, and the impellers being recessed to provide clearance for the fastening devices.

7. In a motor pump unit, a housing having a central portion opposite sides of which form inner side walls of separate pumping chambers, and end closures fixed to the housing and closing one end of said chambers, each end closure having a separate fluid intake, each pumping chamber having a separate outlet, impellers mounted for rotation in said pumping chambers, and axial gap motors within the housing having their rotors carried by the impellers and their stators carried by the central portion of the housing.

References Cited in the file of this patent

UNITED STATES PATENTS

| 459,024 | Short | Sept. 8, 1891 |
| 852,028 | Mershon | Apr. 30, 1907 |
| 1,739,000 | Jordao | Dec. 10, 1929 |
| 1,829,686 | Swendsen | Oct. 27, 1931 |
| 2,245,577 | Dieckman | June 17, 1941 |
| 2,429,114 | Whitted | Oct. 14, 1947 |
| 2,481,172 | Staggs | Sept. 6, 1949 |
| 2,534,520 | Katcher | Dec. 19, 1950 |
| 2,557,879 | Lewis | June 19, 1951 |
| 2,603,157 | Conery | July 15, 1952 |

FOREIGN PATENTS

| 463,259 | Great Britain | Mar. 25, 1937 |
| 582,036 | Great Britain | Nov. 1, 1946 |
| 594,849 | Great Britain | Nov. 20, 1947 |